United States Patent
Roberts

[11] 3,824,764
[45] July 23, 1974

[54] HOBBLE

[76] Inventor: Donald H. Roberts, 500 Lockwood Rd., Ortonville, Mich. 48462

[22] Filed: May 30, 1973

[21] Appl. No.: 365,343

[52] U.S. Cl. .................................... 54/71, 119/126
[51] Int. Cl. .............................................. B68b 1/00
[58] Field of Search ......... 54/71; 119/126, 127, 128

[56] References Cited
UNITED STATES PATENTS

| 735,866 | 8/1903 | Fenstermaker | 54/71 |
|---|---|---|---|
| 1,212,023 | 1/1917 | Curley | 119/128 |
| 2,500,079 | 3/1950 | Jackson | 54/71 |
| 2,697,902 | 12/1954 | Empie | 54/71 |
| 2,761,266 | 9/1956 | Hobkirk | 54/71 |
| 3,174,261 | 3/1965 | Calderhead | 54/71 |

Primary Examiner—Antonio F. Guida
Assistant Examiner—J. Q. Lever
Attorney, Agent, or Firm—Fisher, Krass, Young & Gerhardt

[57] ABSTRACT

A hobble for pacer horses has front and rear leg loops connected to intermediate straps whose length is adjustable. The connection between the loops and intermediate strap is a two piece connector having loop receiving recesses that include the leg loop and a second loop formed by the strap being folded back over itself and around a non-circular member. A lock means prevents movement of the second loop relative to the connector. A shield member encloses the leg loop and terminates at its ends within the connector.

7 Claims, 6 Drawing Figures

PATENTED JUL 23 1974   3,824,764

HOBBLE

This invention relates to a race horse hobble and more particularly to an improved adjustable hobble for training pacer horses.

Hobbles, or hopples as they are sometimes called, have loops for each horses leg with the loops on each side connected together by an adjustable length strap member. A supporting harness generally supports the loops as well as the intermediate strap. The loops help the horse in maintaining an unnatural pacing gait with the legs on the same side of the horses body moving forward and backward in unison. It is desirable that there be no rough parts of the hobble to cause rubbing irritation of the horse where it contacts the skin. It is also desirable that the hobble be light in weight so as to not tire the horse and so the horse is unaware of the hobble.

Since the body sweat of a horse is corrosive it is also desirable to not have any exposed parts made of material, such as metal, that would corrode. Also in order to adjust the hobble precisely to the individual horse the hobble should have an infinite adjustment that is securely maintained during use.

It is therefore an object of this invention to provide a lightweight hobble that has no parts contacting the horse which will cause irritation.

It is a further object to provide such a hobble that is infinitely adjustable and which does not lose its adjustment during use.

A still further object is to provide such a hobble that is easy to manufacture, to assemble and to adjust.

These and other objects and advantages will be readily apparent from the following description and accompanying drawings in which.

Figure 1:
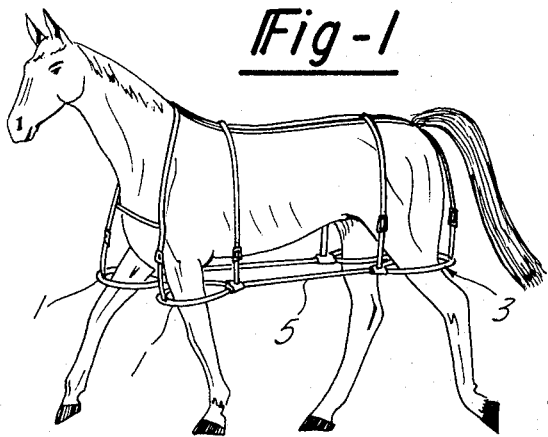
FIG. 1 shows the subject hobble in use on a horse.
Figure 3:
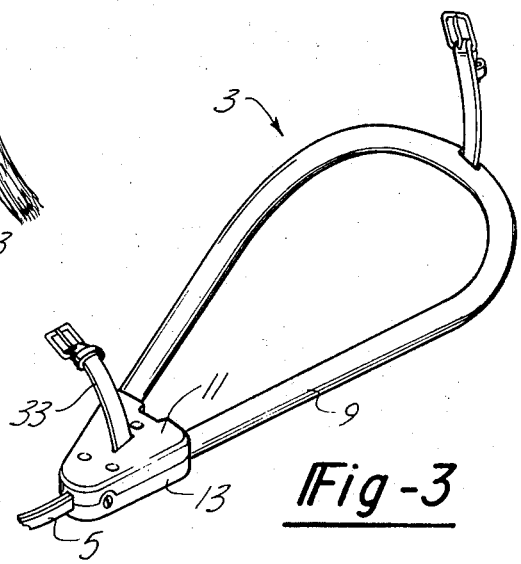
FIG. 3 is a perspective view of a loop connected to the center strap and showing supporting straps.

Referring now to FIG. 1 the hobble includes front and rear loops 1 and 3 connected by intermediate straps 5. The loops include an endless inner strap 7 made of a lightweight high strength material such as nylon. An outer plastic shield 9 serves to protect the inner loop 7 from moisture and wear while presenting a smooth surface that does not cause rubbing irritation on the horses leg.

Figure 2:
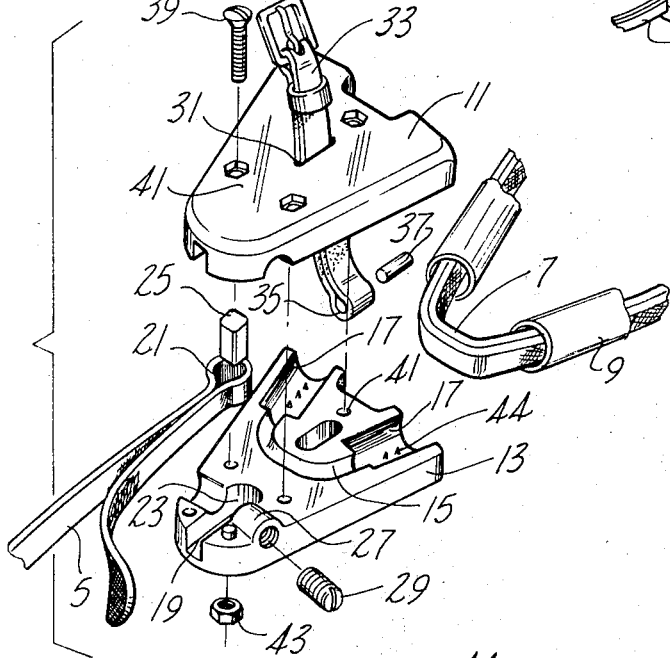
FIG. 2 is an exploded perspective view of the adjustable connector that connects the loops with the connecting strap.

FIG. 2 shows details of a connecting assembly that includes a pair of complementary parts 11 and 13. These parts are preferrably molded of plastic and have U shaped recesses 17 that accommodate the ends of the outer shield member 9. The connector members also have complimentary recesses 19 for receiving the looped end 21 of the intermediate adjusting strap member 5. An enlarged portion 23 of the recess 21 accommodates the increased diameter of the looped end 21 when it encloses a non-circular piece 25.

An internally threaded boss member 27 receives a set screw 29 that acts to lock or clamp the loop end 21 against movement. An aperture 31 serves as opening for a hanger or supporting strap 33 also having a looped end 35. A pin 37 inserted in the loop 35 maintains the loop in an expanded condition and acts to prevent the looped end from passing through the aperture 31 and thus carry the weight of the hobble on the supporting straps 33. The connector parts 11 and 13 are held together by any suitable releasable means such as screws 39 passing through apertures 41 and threaded into nuts 43. Projections 44 molded in the connection parts aid to hold the shield 9 secure in the connectors.

Figure 5:
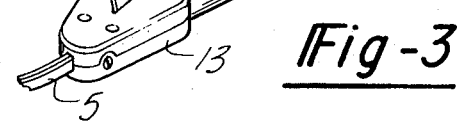
FIG. 5 is a perspective view of a modified loop attaching means.

FIG. 5 illustrates an alternative loop construction having a hook member 45 hooked into looped ends 47 of the inner strap 7. The hook member 45 is shaped to conform to the U shaped recess 15 in the connector part 13. The rigid hook 45 prevents slippage of the inner strap 7 inside the shield 9.

Figure 6:
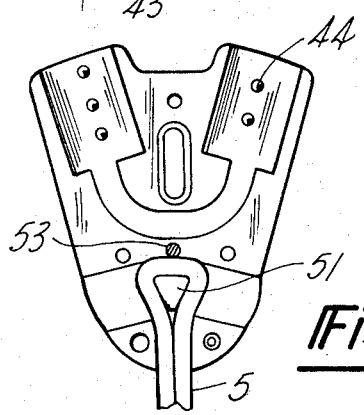
FIG. 6 is a plan view similar to FIG. 4 showing an alternative method of locking the adjustment of the connecting strap.

FIG. 6 illustrates an alternative method of locking the strap 5 from changing adjustment. Instead of the generally quadrangular shaped piece 25 of the embodiment of FIGS. 2 and 4 a generally triangular pin 51 is inserted in the loop 21 of the strap 5 and a second pin 53 inserted in apertures in the connector parts holds the loop against the flat portion of pin 51 preventing slippage of the strap 5.

Figure 4:
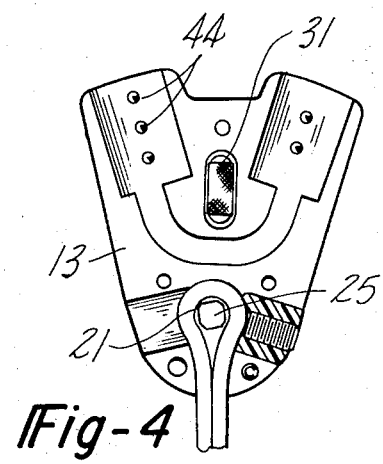
FIG. 4 is a plan view of one half of the connector of FIG. 2 with a portion sectioned.

During use the various parts of the hobble are assembled with the loops 1 and 3 inserted in front and rear connectors respectively. Either the looped end of the strap 7 or the hook 45 is inserted in the recess 15 and the ends of the shield 9 inserted in the enlarged recesses 17 of the connectors. The intermediate strap 5 is looped about the piece 25 or 51 in a manner to provide the desired spacing of the front and rear loops 1 and 3. The connector parts 11 and 13 then are brought together and the screws 39 inserted into the apertures 41 and threaded into nuts 43 to hold the parts together. The set screw 29 is tightened against the loop as shown in FIG. 4 to prevent slippage. If the FIG. 6 embodiment is used, the pin 53 is inserted to prevent the loop from slipping around the triangular pin 51.

It will be seen that I have provided a simple hobble assembly that provides the desired non-slipping infinite adjustment without the use of exposed buckles or the like, has no exposed parts that are subject to corrosion and has only smooth surfaces that contact the horses skin.

I claim:

1. An adjustable hobble assembly including a pair of leg encircling loops, an adjustable length intermediate member attached to the loops by connector members, at least one of said connector members having first loop receiving means for one of said leg encircling loops and second loop receiving means for a second loop formed by said intermediate member folded back upon itself and releasable locking means in said connector for adjusting the length of and preventing slippage of said second loop.

2. The hobble assembly of claim 1 wherein said leg encircling loop includes an endless inner member having an end received in said first loop receiving means and an outer smooth shield member surrounding said inner member over its length outside of the connector and having ends received in enlarged portions of said first loop receiving members, whereby said inner member is protected.

3. The hobble assembly of claim 2 wherein said endless inner member comprises a double thickness looped member and a connecting hook member having hook portions engaging the loops formed by the double member, said connecting hook member shaped to fit in said first loop receiving means.

4. The hobble assembly of claim 1 wherein said connector comprises a pair of complementary parts forming therebetween a first U shaped loop receiving recess for receiving said one leg encircling loop and a non-circular member forming a hub around which said second loop is formed.

5. The hobble assembly of claim 4 wherein the locking means comprises a threaded member adjustable in one of said parts to contact said second loop to force it against said non-circular member to prevent movement of the loop relative to the non-circular member.

6. The hobble assembly of claim 4 wherein the locking means comprises removable pin means insertable into one of the parts at a location spaced from said non-circular member a distance equal to the thickness of the intermediate member whereby said intermediate member is prevented from movement relative to said non-circular member.

7. The hobble assembly of claim 1 wherein one of said parts has an aperture receiving a third loop member extending into the space between said parts, a spreader member in said third loop to prevent the same from passing through the aperture, said third loop member forming a supporting member adapted to be attached to a harness assembly.

* * * * *